US012556207B2

(12) United States Patent
Shin et al.

(10) Patent No.: US 12,556,207 B2
(45) Date of Patent: Feb. 17, 2026

(54) RADIO FREQUENCY FRONT END MODULE WITH INTEGRATED RESONATOR AND ANTENNA

(71) Applicant: SKYWORKS GLOBAL PTE. LTD., Singapore (SG)

(72) Inventors: Kwang Jae Shin, Yongin (KR); Alexandre Augusto Shirakawa, Cardiff by the Sea, CA (US); Yiliu Wang, Irvine, CA (US)

(73) Assignee: SKYWORKS GLOBAL PTE. LTD., Singapore (SG)

( * ) Notice: Subject to any disclaimer, the term of this patent is extended or adjusted under 35 U.S.C. 154(b) by 494 days.

(21) Appl. No.: 17/951,652

(22) Filed: Sep. 23, 2022

(65) Prior Publication Data
US 2023/0098376 A1 Mar. 30, 2023

Related U.S. Application Data

(60) Provisional application No. 63/249,674, filed on Sep. 29, 2021.

(51) Int. Cl.
  *H04B 1/18* (2006.01)
  *H01Q 1/22* (2006.01)
  *H01Q 21/06* (2006.01)
  *H04B 1/00* (2006.01)

(52) U.S. Cl.
  CPC ......... *H04B 1/0067* (2013.01); *H01Q 1/2283* (2013.01); *H01Q 21/065* (2013.01); *H04B 1/18* (2013.01)

(58) Field of Classification Search
  None
  See application file for complete search history.

(56) References Cited

U.S. PATENT DOCUMENTS

| | | | |
|---|---|---|---|
| 2008/0007369 A1 | 1/2008 | Barber et al. | |
| 2009/0045703 A1 | 2/2009 | Barber et al. | |
| 2017/0077900 A1* | 3/2017 | Park | H10N 30/02 |
| 2018/0337454 A1* | 11/2018 | Han | H03H 9/564 |
| 2020/0052393 A1* | 2/2020 | Fang | H01Q 9/0414 |
| 2020/0274520 A1 | 8/2020 | Shin et al. | |
| 2020/0304103 A1* | 9/2020 | Kawasaki | H03H 9/059 |
| 2020/0373911 A1 | 11/2020 | Wang et al. | |
| 2021/0028765 A1 | 1/2021 | Wang et al. | |
| 2021/0194456 A1* | 6/2021 | Luo | H03H 3/02 |
| 2022/0060176 A1* | 2/2022 | Kim | H03H 9/02015 |
| 2022/0320712 A1* | 10/2022 | Lu | H01L 23/5386 |

FOREIGN PATENT DOCUMENTS

WO 2019169025 A1 9/2019

OTHER PUBLICATIONS

Qi et al, Miniaturized Magnetoelectric Antenna Based on FBAR Structures Acoustic Excitation. 2020 (Year: 2020).*

* cited by examiner

*Primary Examiner* — German Viana Di Prisco
(74) *Attorney, Agent, or Firm* — Lando & Anastasi, LLP

(57) ABSTRACT

A radio-frequency front end module comprises a first substrate, a second substrate arranged opposing the first substrate, one or more resonators disposed on a surface of the first substrate, the first surface of the first substrate facing the second substrate, and one or more antennas that are each supported by the first substrate and the second substrate. A beamforming antenna is also provided, as is a wireless mobile device.

18 Claims, 18 Drawing Sheets

RADIO FREQUENCY FRONT END MODULE WITH INTEGRATED RESONATOR AND ANTENNA

CROSS-REFERENCE TO RELATED APPLICATIONS

This application claims priority under 35 U.S.C. § 119(e) to U.S. Provisional Patent Application Ser. No. 63/249,674, titled "RADIO FREQUENCY FRONT END MODULE WITH INTEGRATED RESONATOR AND ANTENNA," filed Sep. 29, 2021, the entire contents of which is incorporated herein by reference in its entirety for all purposes.

BACKGROUND

Field

Aspects and embodiments disclosed herein relate to radio-frequency front end (RFFE) modules, in particular to RFFE modules having resonator devices and antennas. Aspects and embodiments disclosed herein also relate to beamforming antenna modules and wireless mobile devices comprising RFFE modules.

Description of the Related Technology

Radio-frequency front end (RFFE) modules typically comprise acoustic wave devices and antennas. Acoustic wave devices, for example, bulk acoustic wave (BAW) devices may be utilized as components of filters in radio-frequency electronic systems. For instance, filters in a radio-frequency front end of a mobile phone can include acoustic wave filters. Such filters can act as passband filters. In many cases, acoustic wave devices, in particular BAW devices, are connected to the antenna of a radio-frequency front end module, such as inside a mobile phone. Antennas, often in the form of patch antennas, receive or transmit the signals as required by a wireless device, such as a mobile phone. Antennas will often pass a received signal to, or receive a signal for transmitting from, an acoustic wave device.

With the advent of 5G New Radio (5G NR), new frequency ranges have been opened up for use, including the lower frequency ranges of Frequency Range 1 (FR1), which spans approximately the range 0.4 GHz to 7.1 GHz, and the higher frequency ranges of Frequency Range 2 (FR2), which spans approximately the range 24 GHz to 53 GHz. New RFFE modules are desired that are adapted to work at these frequency ranges.

SUMMARY

According to one embodiment there is provided a radio-frequency front end module comprising a first substrate, a second substrate arranged opposing the first substrate, one or more resonators disposed on a first surface of the first substrate, the first surface of the first substrate facing the second substrate, and one or more antennas that are each supported by the first substrate or the second substrate.

In one example, the one or more antennas are each supported by a surface of the first substrate or the second substrate other than the first surface of the first substrate.

In one example, the first substrate lies within a first plane and the second substrate lies within a second plane, the second plane being parallel to the first plane.

In one example, the first substrate and the second substrate are hermetically sealed to form a cavity between the first substrate and the second substrate, the one or more resonators being disposed within the cavity.

In one example, the one or more resonators are electrically connected to the one or more antennas.

In one example, the one or more resonators include one or more or bulk acoustic wave resonators and/or Lamb wave resonators.

In one example, the one or more antennas are patch antennas.

In one example, either or both of the first substrate and the second substrate comprise a silicon wafer.

In one example, all of the one or more antennas are supported by the second substrate.

In one example, the one or more antennas are supported by a first surface of the second substrate, the first surface of the second substrate facing the first substrate.

In one example, the one or more antennas are supported by a second surface of the second substrate, the second surface of the second substrate facing an opposite direction to a first surface of the second substrate, the first surface of the second substrate facing the first substrate.

In one example, at least one antenna is supported by the first surface of the second substrate and at least one antenna is supported by the second surface of the second substrate.

In one example, the second substrate comprises a material having a high permittivity. A high permittivity may be a relative permittivity of greater than 20 or greater than 30.

In one example, the radio-frequency front end module further comprises a layer of high permittivity material disposed upon a surface of the second substrate that supports the one or more antennas, the layer of high permittivity material being located between the second substrate and the one or more antennas. A high permittivity may be a relative permittivity of greater than 20 or greater than 30.

In one example, the second substrate comprises a material having a high resistivity. A high resistivity may be a resistivity of greater than or equal to 200 Ωm, or greater than or equal to 2,000 Ωm.

In one example, the layer of high permittivity material has a thickness substantially less than a thickness of the second substrate. A high permittivity may be a relative permittivity of greater than or equal to 20 or greater than or equal to 30.

In one example, all of the one or more antennas are supported by the first substrate.

In one example, the first substrate comprises a material having a high permittivity. A high permittivity may be a relative permittivity of greater than or equal to 20 or greater than or equal to 30.

In one example, the radio-frequency front end module further comprises a layer of high permittivity material disposed upon a surface of the first substrate that supports the one or more antennas, the layer of high permittivity material being located between the first substrate and the one or more antennas. A high permittivity may be a relative permittivity of greater than 20 or greater than 30.

In one example, the first substrate comprises a material having a high resistivity. A high resistivity may be a resistivity of greater than or equal to 200 Ωm or greater than or equal to 2,000 Ωm.

In one example, the layer of high permittivity material has a thickness substantially less than a thickness of the first substrate.

According to a second embodiment there is provided a wireless mobile device comprising a radio-frequency front end module, the radio-frequency front end module having a first substrate, a second substrate arranged opposing the first substrate, one or more resonators disposed on a surface of the first substrate, the first surface of the first substrate facing the second substrate, and one or more antennas that are each supported by the first substrate or the second substrate.

According to a third embodiment there is provided a beamforming antenna module comprising an array of radio-frequency front end modules, each radio-frequency front end module having a first substrate, a second substrate arranged opposing the first substrate, one or more resonators disposed on a surface of the first substrate, the first surface of the first substrate facing the second substrate, and one or more antennas that are each supported by the first substrate or the second substrate.

According to a fourth embodiment there is provided a wireless mobile device comprising a beamforming antenna module, the beamforming antenna module having an array of radio-frequency front end modules, each radio-frequency front end module having a first substrate, a second substrate arranged opposing the first substrate, one or more resonators disposed on a surface of the first substrate, the first surface of the first substrate facing the second substrate, and one or more antennas that are each supported by the first substrate or the second substrate.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to a radio-frequency front end (RFFE) module, in particular for use in 5G NR frequency ranges. The RFFE modules described herein may be used with the high frequencies of 5G NR FR2.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Film bulk acoustic wave resonators (FBARs) are a form of bulk acoustic wave (BAW) resonator that generally include a layer of piezoelectric material sandwiched between a top and a bottom electrode and suspended over a cavity that allows for the layer of piezoelectric material to vibrate. A signal applied across the top and bottom electrodes causes an acoustic wave to be generated in and travel through the layer of piezoelectric material. An FBAR exhibits a frequency response to applied signals with a resonance peak determined by a thickness of the film of piezoelectric material. The primary acoustic wave generated in an FBAR is an acoustic wave that travels through the layer of piezoelectric material in a direction perpendicular to layers of conducting material forming the top and bottom electrodes.

Figure 1:
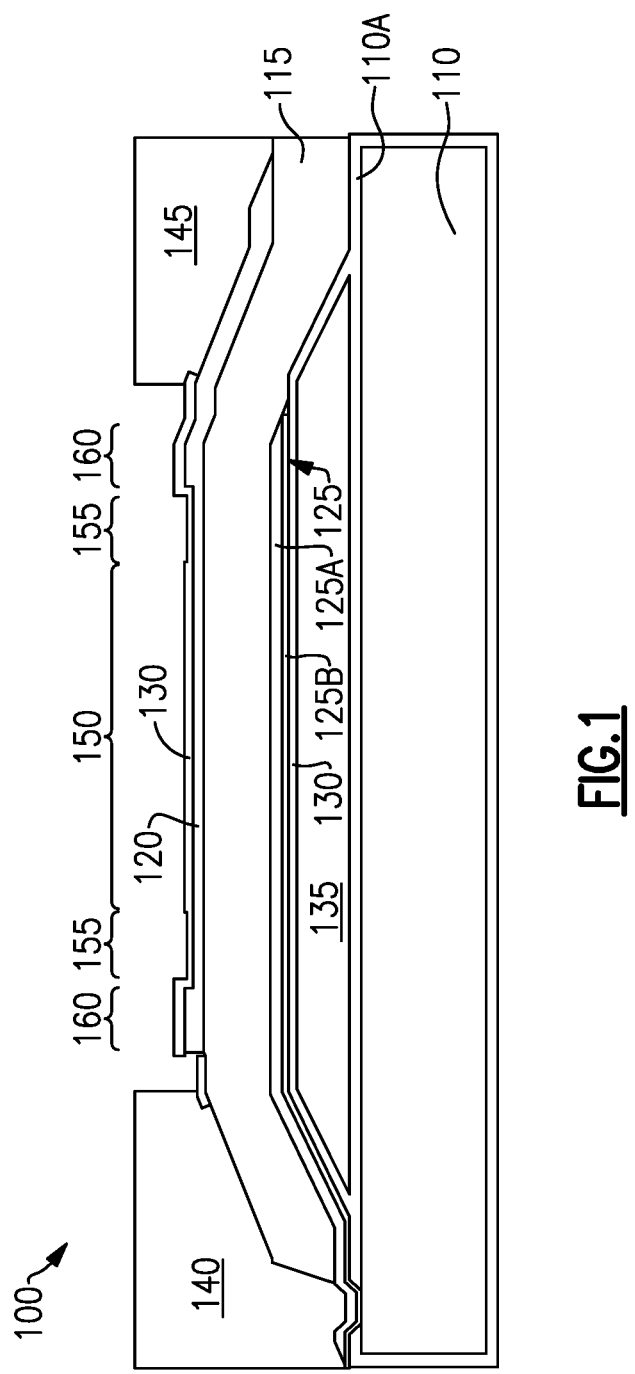
FIG. 1 is a cross-sectional diagram of a film bulk acoustic wave (FBAR) device.

FIG. 1 is cross-sectional view of an example of a FBAR, indicated generally at 100. The FBAR 100 is disposed on a substrate 110, for example, a silicon substrate that may include a dielectric surface layer 110A of, for example, silicon dioxide. The FBAR 100 includes a layer or film of piezoelectric material 115, for example, aluminum nitride (AlN). A top electrode 120 is disposed on top of a portion of the layer or film of piezoelectric material 115 and a bottom electrode 125 is disposed on the bottom of a portion of the layer or film of piezoelectric material 115. The top electrode 120 may be formed of, for example, ruthenium (Ru). The bottom electrode 125 may include a layer 125A of Ru disposed in contact with the bottom of the portion of the layer or film of piezoelectric material 115 and a layer 125b of titanium (Ti) disposed on a lower side of the layer 125A of Ru opposite a side of the layer 125A of Ru in contact with the bottom of the portion of the layer or film of piezoelectric material 115. Each of the top electrode 120 and the bottom electrode 125 may be covered with a layer of dielectric material 130, for example, silicon dioxide. An air cavity 135 is defined beneath the layer of dielectric material 130 covering the bottom electrode 125 and the surface layer 110A of the substrate 110. A bottom electrical contact 140 formed of, for example, copper may make electrical connection with the bottom electrode 125 and a top electrical contact 145 formed of, for example, copper may make electrical connection with the top electrode 120.

The FBAR 100 may include a central region 150 including a main active domain in the layer or film of piezoelectric material 115 in which a main acoustic wave is excited during operation. A recessed frame region or regions 155 may bound and define the lateral extent of the central region 150. The recessed frame region(s) 155 may be defined by areas that have a thinner layer of dielectric material 130 on top of the top electrode 120 than in the central region 150. The dielectric material layer 130 in the recessed frame region(s) 155 may be from about 10 nm to about 100 nm thinner than the dielectric material layer 130 in the central region 150 and/or the difference in thickness of the dielectric material in the recessed frame region(s) 155 vs. in the central region 150 may cause the resonant frequency of the device in the recessed frame region(s) 155 to be between about 5 MHz to about 50 MHz higher than the resonant frequency of the device in the central region 150. A raised frame region or regions 160 may be defined on an opposite side of the recessed frame region(s) 155 from the central region 150 and may directly abut the outside edge(s) of the recessed frame region(s) 155. The raised frame region(s) 160 may be defined by areas where the top electrode 120 is thicker than in the central region 150 and in the recessed frame region(s) 155. The top electrode 120 may have the same thickness in the central region 150 and in the recessed frame region(s) 155 but a greater thickness in the raised frame region(s) 160. The top electrode 120 may be between about 50 nm and about 500 nm thicker in the raised frame region(s) 160 than in the central region 150 and/or in the recessed frame region(s) 155. The raised frame region(s) may be, for example, 4 μm or more in width.

The recessed frame region(s) 155 and the raised frame region(s) 160 may contribute to dissipation or scattering of transverse acoustic waves generated in the FBAR 100 during operation and/or may reflect transverse waves propagating outside of the recessed frame region(s) 155 and the raised frame region(s) 160 and prevent these transverse acoustic waves from entering the central region and inducing spurious signals in the main active domain region of the FBAR. Without being bound to a particular theory, it is believed that due to the thinner layer of dielectric material 130 on top of the top electrode 120 in the recessed frame region(s) 155, the recessed frame region(s) 155 may exhibit a higher velocity of propagation of acoustic waves than the central region 150. Conversely, due to the increased thickness and mass of the top electrode 120 in the raised frame region(s) 160, the raised frame regions(s) 160 may exhibit a lower velocity of propagation of acoustic waves than the central region 150 and a lower velocity of propagation of acoustic waves than the recessed frame region(s) 155. The discontinuity in acoustic wave velocity between the recessed frame region(s) 155 and the raised frame region(s) 160 creates a barrier that scatters, suppresses, and/or reflects transverse acoustic waves.

It should be appreciated that the FBAR illustrated in FIG. 1 and the FBARs and other structures illustrated in the other figures accompanying this disclosure are illustrated in a highly simplified form. The relative dimensions of the different features are not shown to scale. Further, embodiments of FBARs may include additional features or layers not illustrated or may lack one or more features or layers illustrated herein.

Figure 2:
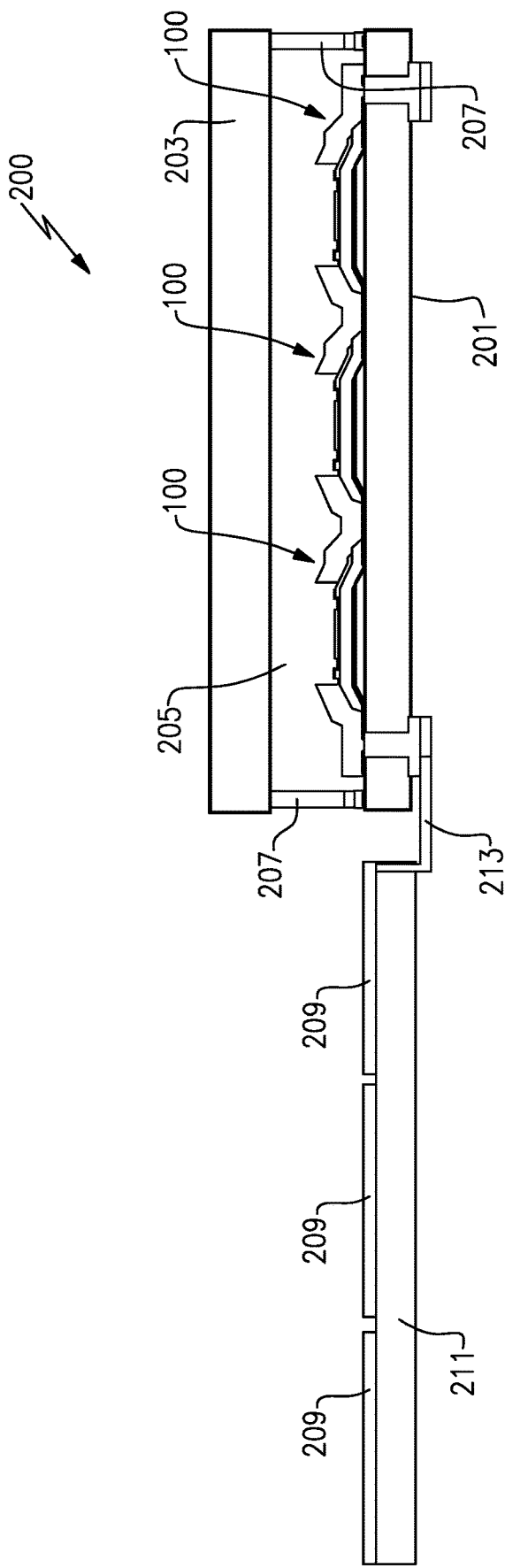
FIG. 2 is a cross-sectional diagram of a known radio-frequency front end (RFFE) module.

FBARs, such as those described with reference to FIG. 1, are typically included in radio-frequency devices, such as radio-frequency front end (RFFE) modules. An RFFE module typically also comprises one or more antennas. The FBARs in such an RFFE module may, for example, act as a passband filter in the transmit and/or receive chain of a wireless mobile device, such as a mobile telephone. A typical arrangement of a RFFE module is illustrated in cross-section in FIG. 2.

RFFE module 200 comprises a plurality (of which three are illustrated) of FBARs 100. These are arranged on a first substrate 201, typically a silicon of wafer. An opposing second substrate 203, again typically a silicon wafer, is disposed above the FBARs 100. In other words, the first substrate 201 and the second substrate 203 are arranged substantially in parallel, with the FBARs 100 disposed on a surface of the first substrate 201, being a surface facing the second substrate 203, such that they are between the first substrate 201 and the second substrate 203.

A cavity or enclosure 205 is formed between the first substrate 201 and the second substrate 203 by the pillars 207 located towards the edges of the first substrate 201 and the second substrate 203. The pillars 207 connect to the first substrate 201 and the second substrate 203 and form a hermetic seal. In this manner, the FBARs 100 are provided within the hermetically sealed cavity or enclosure 205.

RFFE module 200 also comprises an antenna 209. The antenna 209 is a patch antenna arranged on substrate 211, also typically a silicon wafer. The antenna 209 is electrically connected to the FBARs 100 via connection 213, but is physically separated from them, often being disposed in a different location within a device comprising the RFFE module 200. The size of the antenna utilized depends upon the frequencies with which it is intended to operate. Typically, the size of the antenna of an RFFE module is much greater than the size of the module comprising the filters and/or acoustic devices.

The present disclosure provides RFFE modules having an antenna integrated with the FBAR module. One such RFFE module is illustrated in FIG. 3.

Figure 3:
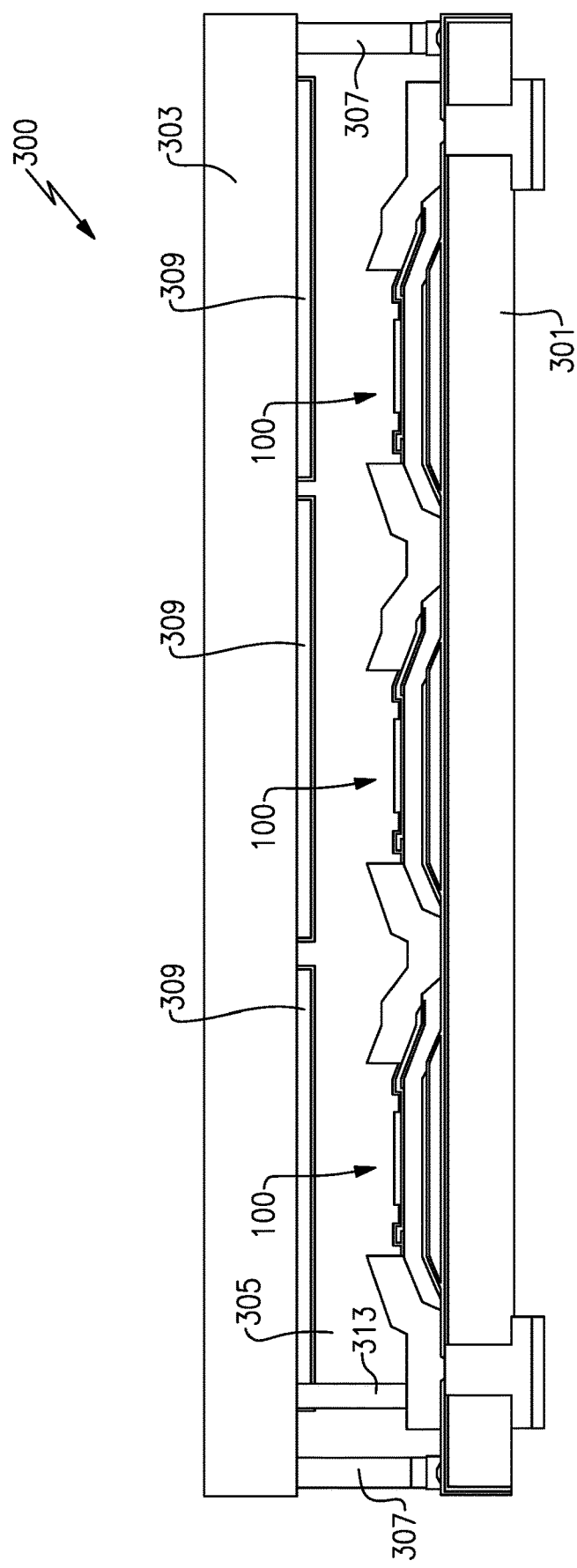
FIG. 3 is a cross-sectional diagram of a first RFFE module according to aspects disclosed herein.

FIG. 3 illustrates a cross-section of RFFE module 300 having a number of FBARs 100, of which three are shown. The FBARs are disposed on a surface of the first substrate 301. A second substrate 303 is provided as a cap over the FBARs 100. That is, the first substrate 301 and the second substrate 303 are disposed such that the surface of the first substrate 301 upon which the FBARs are positioned faces the second substrate 303. The first substrate 301 and the second substrate 303 are arranged substantially in parallel.

The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303. Accordingly, the FBARs 100 are provided within a hermetically sealed environment. Housing the FBARs 100 in a hermetically sealed environment prevents moisture or other environmental effects from affecting the FBARs 100, in particular, ensuring that their resonant and anti-resonant frequencies do not change, increasing the quality of the device.

As well as enclosing the cavity or enclosure 305, the second substrate 303 also supports an antenna 309. Antenna 309 is a patch antenna. Antenna 309 is supported by an inner surface of the second substrate 303, the inner surface being the surface facing the first substrate 301, or in other words, the surface within the cavity or enclosure 305. The antenna 309 is connected to the FBARs 100 via connection 313. Positioning the antenna 309 on the inner surface of the second substrate 303 can protect the antenna 309 from damage.

The first substrate 301 is formed from a high resistivity material, for example, a silicon or gallium arsenide (GaAs) wafer. The second substrate 303, on the other hand, is formed from a high permittivity material such as lithium niobite (LiNbO$_3$). The minimum size of the antenna is determined by the permittivity of the antenna and of the substrate upon which it is mounted. In particular, the width and/or length of a patch antenna are proportional to $\varepsilon^{-1/2}$, wherein $\varepsilon$ is the permittivity of the antenna. A high permittivity material enables smaller antennas to be used, and the antenna pattern size can be reduced. On the other hand, antennas mounted on a low permittivity substrate may be larger than antennas mounted on a high permittivity substrate. The use of a substrate having a high permittivity enables the size of the antenna to be reduced to the size of the portion of the RFFE module comprising the FBAR devices, allowing the antenna to be combined with the FBAR devices into a single physical unit.

Figure 4:
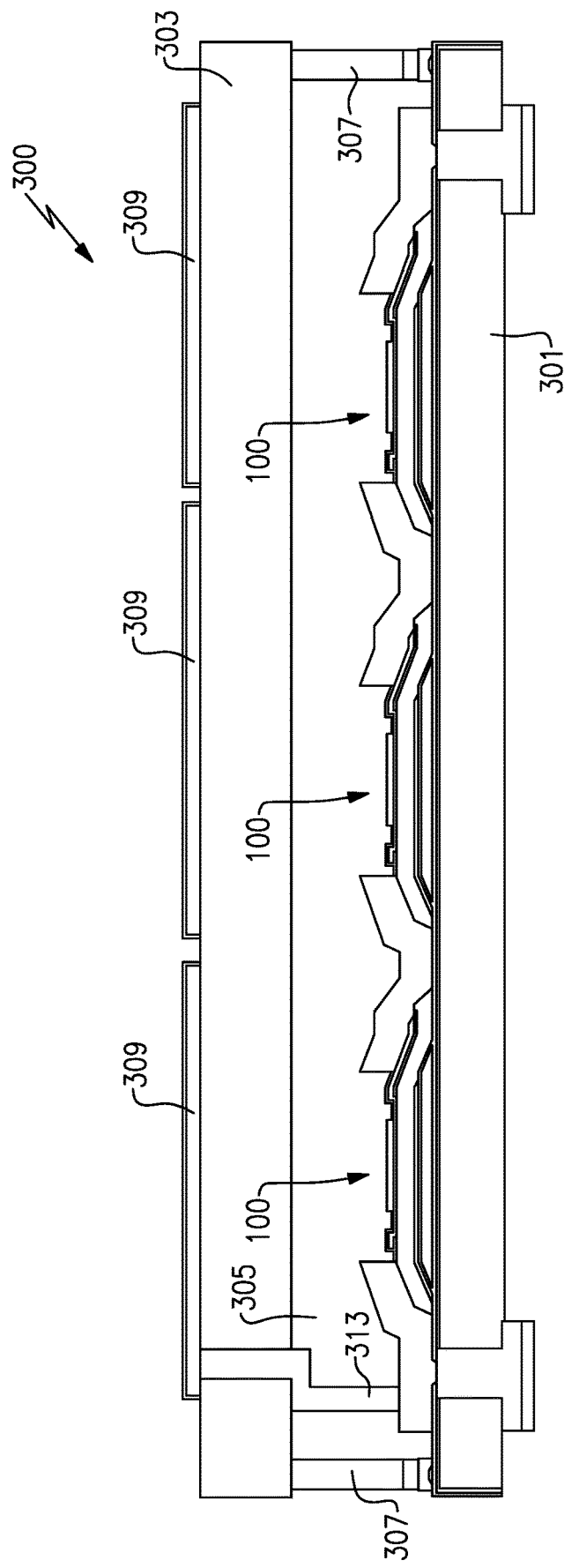
FIG. 4 is a cross-sectional diagram of a second RFFE module according to aspects disclosed herein.

A second RFFE module according to the disclosure is illustrated in FIG. 4. This RFFE module is similar to that illustrated in FIG. 3. As before, RFFE module 300 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

Again, as with the RFFE module of FIG. 3, the second substrate 303 of the RFFE module of FIG. 4 also supports an antenna 309, though the antenna 309 is supported by an outer surface of the second substrate 303, rather than an inner surface. The outer surface of the second substrate 303 is the surface facing away from the first substrate 301. That is, the surface of the second substrate 303 that is not within the cavity or enclosure 305. To connect the FBARs 100, the connection 313 passes through the second substrate 303.

As before, the first substrate 301 is formed from a high resistivity material, for example, a silicon or gallium arsenide (GaAs) wafer. The second substrate 303, on the other hand, is formed from a high permittivity material such as lithium niobate (LiNbO$_3$). As noted above, this enables the size of the antenna to be reduced to enable it to be combined with the FBAR devices into a single physical module.

Figure 5:
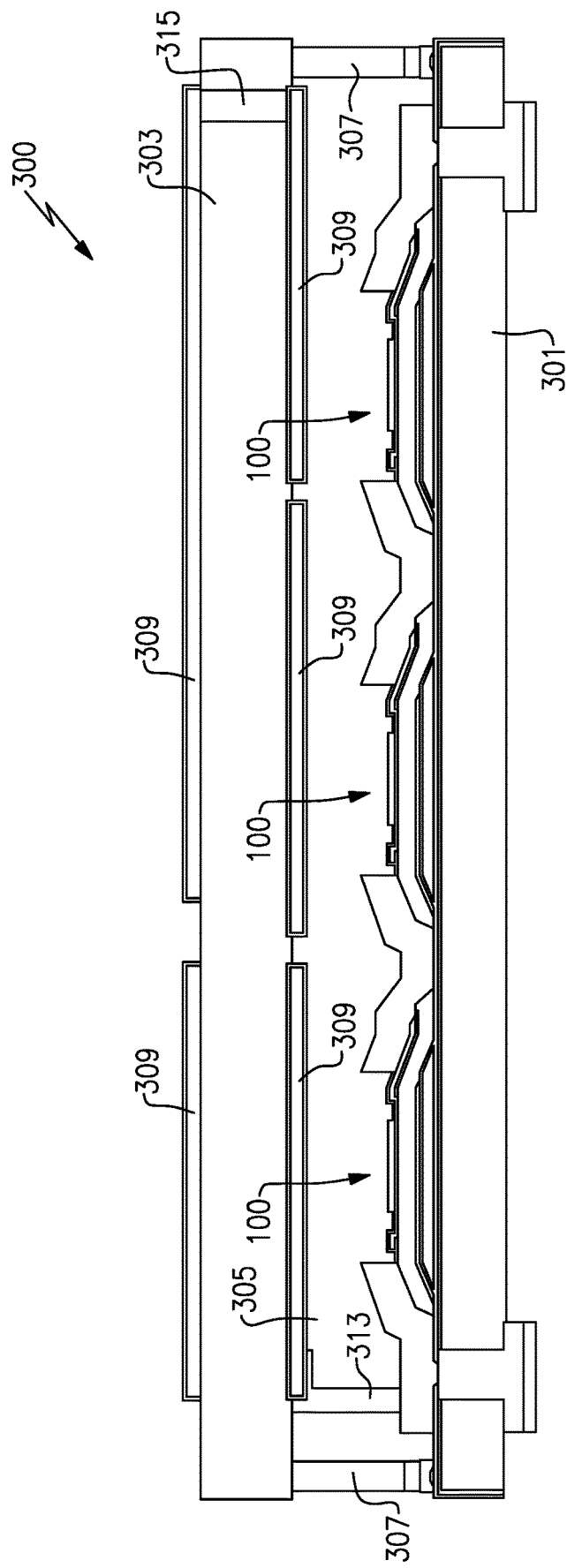
FIG. 5 is a cross-sectional diagram of a third RFFE module according to aspects disclosed herein.

Turning now to FIG. 5, this figure illustrates a third RFFE module according to the disclosure. This RFFE module shares features with both the RFFE module illustrated in FIG. 3 and with the RFFE module illustrated in FIG. 4.

The RFFE module 300 of FIG. 5 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

The RFFE module of FIG. 5 also supports an antenna 309 on the second substrate 303. In this case, however, the antenna 309 is supported by both an inner surface and an outer surface of the second substrate 303. The inner surface is the surface facing the first substrate 301, or, in other words, the surface within the cavity or enclosure 305. The outer surface of the second substrate 303 is the surface facing away from the first substrate 301, opposite the first surface. That is, the outer surface is the surface of the second substrate 303 that is not within the cavity or enclosure 305. To connect the FBARs 100, a first connection 313 connects the FBARs 100 to the portions of the antenna 309 on the inner surface of the second substrate 303 and a second connection 315 connections the portions of the antenna 309 on the inner surface of the second substrate 303 to the portions of the antenna 309 on the outer surface of the second substrate 303. Positioning a portion of the antenna 309 on the inner surface of the second substrate 303 can help protect the antenna 309 from damage.

Using both the inner and outer surfaces of the second substrate enables a larger antenna to be compactly combined with the FBAR devices into a single physical unit. This enables the RFFE module to work not just with the higher frequencies of 5G NR FR2, but also with the lower frequencies of 5G NR FR1, which utilize larger antennas due to the lower frequency ranges.

As before, the first substrate 301 is formed from a high resistivity material, for example, a silicon or gallium arsenide (GaAs) wafer. The second substrate 303, on the other hand, is formed from a high permittivity material such as lithium niobate (LiNbO$_3$). As noted above, this enables the size of the antenna to be reduced to enable it to be combined with the FBAR devices into a single physical module.

Figure 6:
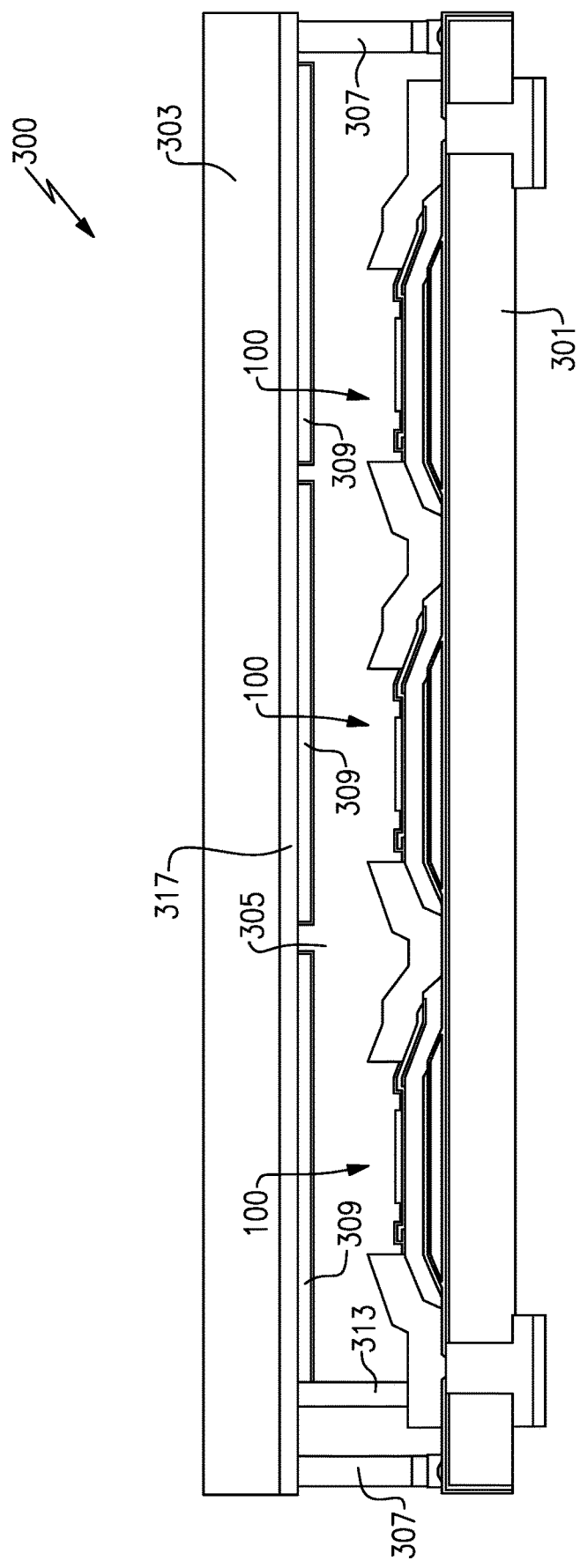
FIG. 6 is a cross-sectional diagram of a fourth RFFE module according to aspects disclosed herein.

FIG. 6 illustrates a cross-section of a fourth RFFE module according to the disclosure. RFFE module 300 has a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

As well as enclosing the cavity or enclosure 305, the second substrate 303 also supports an antenna 309. Antenna 309 is a patch antenna. Antenna 309 is disposed on an inner surface of the second substrate 303, the inner surface being the surface facing the first substrate 301, or in other words the surface within the cavity or enclosure 305. The antenna 309 is connected to the FBARs 100 via connection 313. Positioning the antenna 309 on the inner surface of the second substrate 303 can protect the antenna 309 from damage.

Unlike the RFFE modules of FIGS. 3-5, the RFFE module 300 of FIG. 6 has both the first substrate 301 and the second substrate 303 being formed from a high resistivity material, for example, a silicon or gallium arsenide (GaAs) wafer. The RFFE module 300 therefore comprises a layer of a high permittivity material 317 disposed on the inner surface of the second substrate 303 such that the antenna 309 is mounted on this layer of high permittivity material 317 rather than onto the high resistivity material of the second substrate directly. The use of a layer of high permittivity material 317 for mounting the antenna enables the size of the antenna to be reduced to enable it to be combined with the FBAR devices into a single physical module, in the same manner as when the second substrate is made entirely from a high permittivity material.

An advantage associated with using a second substrate formed from a high resistivity material, and in particular the same material as the first substrate, is that they will have the same thermal expansion coefficient. This means that the RFFE module is put under less strain due to varying temperatures and the different amounts by which the components expand and contract with temperature changes. The use of only a layer of high permittivity material, having a different thermal expansion coefficient to the high resistivity material, means that the stresses associated with the different thermal expansion coefficients are minimized compared to the case of the entire second substrate being manufactured from high permittivity material. Additionally, the use of a high permittivity layer is easily applicable to current processes and chips which utilize cap wafers, i.e., second substrates, made from high resistivity silicon.

Figure 7:
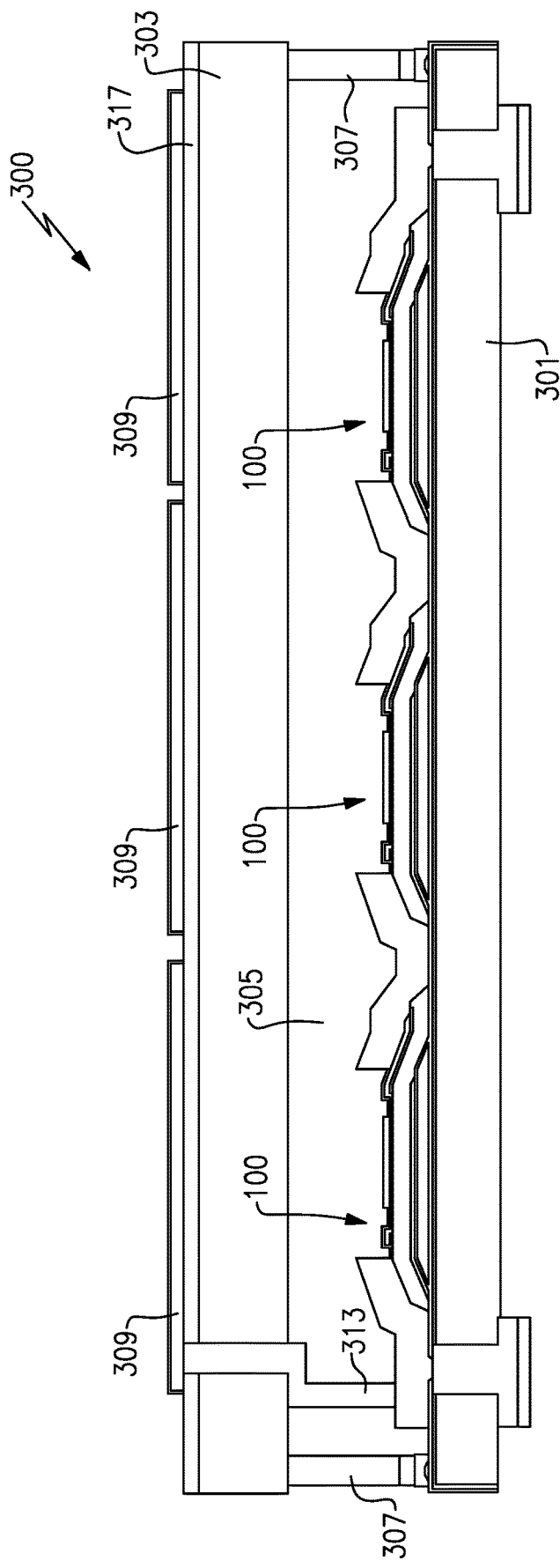
FIG. 7 is a cross-sectional diagram of a fifth RFFE module according to aspects disclosed herein.

A fifth RFFE module according to the disclosure is illustrated in FIG. 7. This RFFE module is similar to that illustrated in FIG. 6. As before, RFFE module 300 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

Again, as with the RFFE module of FIG. 6, the second substrate 303 of the RFFE module of FIG. 7 also supports an antenna 309, though the antenna 309 is supported by an outer surface of the second substrate 303, rather than an inner surface. The outer surface of the second substrate 303 is the surface facing away from the first substrate 301. That is, the surface of the second substrate 303 that is not within the cavity or enclosure 305. To connect the FBARs 100, the connection 313 passes through the second substrate 303.

As in FIG. 6, both the first substrate 301 and the second substrate 303 are formed from a high resistivity material, for example, a silicon or gallium arsenide (GaAs) wafer. The RFFE module 300 of FIG. 7 therefore comprises a layer of a high permittivity material 317 disposed on the outer surface of the second substrate 303 such that the antenna 309 is mounted on this layer of high permittivity material 317 rather than onto the high resistivity material of the second substrate directly. The use of a layer of high permittivity material 317 for mounting the antenna enables the size of the antenna to be reduced to enable it to be combined with the FBAR devices into a single physical module, in the same manner as when the second substrate is made entirely from a high permittivity material.

As noted above, an advantage associated with using a second substrate formed from a high resistivity material, and in particular the same material as the first substrate, is that they will have the same thermal expansion coefficient. This means that the stresses associated with the different thermal expansion coefficients are minimized compared to the case of the entire second substrate being manufactured from high permittivity material. Additionally, the use of a high permittivity layer is easily applicable to current processes and chips which utilize cap wafers, i.e., second substrates, made from high resistivity silicon.

Figure 8:
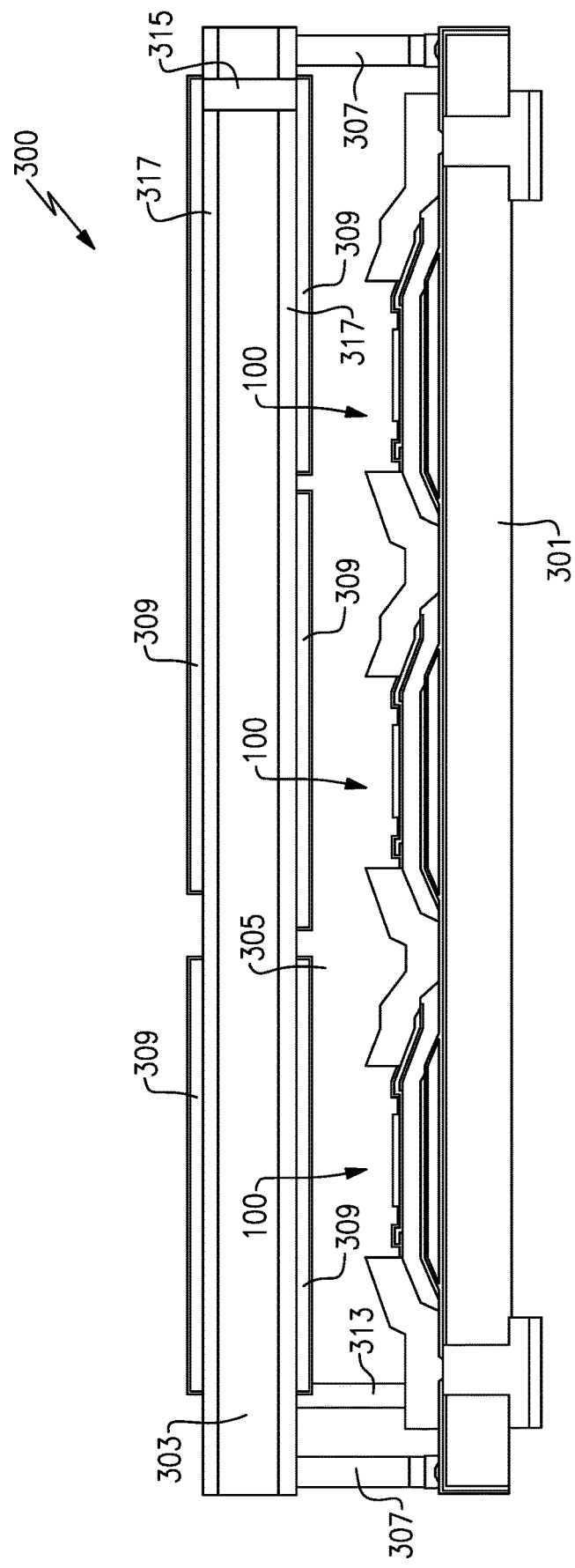
FIG. 8 is a cross-sectional diagram of a sixth RFFE module according to aspects disclosed herein.

Turning now to FIG. 8, this figure illustrates a sixth RFFE module according to the disclosure. This RFFE module shares features with both the RFFE module illustrated in FIG. 6 and with the RFFE module illustrated in FIG. 7.

The RFFE module 300 of FIG. 8 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

The RFFE module of FIG. 8 also supports an antenna 309 on the second substrate 303. In this case, however, the antenna 309 is supported by both an inner surface and an outer surface of the second substrate 303. The inner surface is the surface facing the first substrate 301, or, in other words, the surface within the cavity or enclosure 305. The outer surface of the second substrate 303 is the surface facing away from the first substrate 301, opposite the first surface. That is, the outer surface is the surface of the second substrate 303 that is not within the cavity or enclosure 305. To connect the FBARs 100, a first connection 313 connects the FBARs 100 to the portions of the antenna 309 on the inner surface of the second substrate 303 and a second connection 315 connections the portions of the antenna 309 on the inner surface of the second substrate 303 to the portions of the antenna 309 on the outer surface of the second substrate 303. Positioning a portion of the antenna 309 on the inner surface of the second substrate 303 can help protect the antenna 309 from damage.

Using both the inner and outer surfaces of the second substrate enables a larger antenna to be compactly combined with the FBAR devices into a single physical unit. This enables the RFFE module to work not just with the higher frequencies of 5G NR FR2, but also with the lower frequencies of 5G NR FR1, which utilize larger antennas due to the lower frequency ranges.

As in FIGS. 6 and 7, both the first substrate 301 and the second substrate 303 are formed from a high resistivity material, for example, a silicon or gallium arsenide (GaAs) wafer. The RFFE module 300 of FIG. 8 therefore comprises a layer of a high permittivity material 317 disposed on the inner surface of the second substrate 303 and on the outer surface of the second substrate 303 such that the antenna 309 is mounted on this layer of high permittivity material 317 rather than onto the high resistivity material of the second substrate directly. The use of a layer of high permittivity material 317 for mounting the antenna enables the size of the antenna to be reduced to enable it to be combined with the FBAR devices into a single physical module, in the same manner as when the second substrate is made entirely from a high permittivity material.

As noted above, an advantage associated with using a second substrate formed from a high resistivity material, and in particular the same material as the first substrate, is that they will have the same thermal expansion coefficient. This means that the stresses associated with the different thermal expansion coefficients are minimized compared to the case of the entire second substrate being manufactured from high permittivity material. Additionally, the use of a high permittivity layer is easily applicable to current processes and chips which utilize cap wafers, i.e., second substrates, made from high resistivity silicon.

A seventh RFFE module according to the disclosure will now be discussed with respect to FIG. 9. The RFFE module 300 of FIG. 9 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

Figure 9:
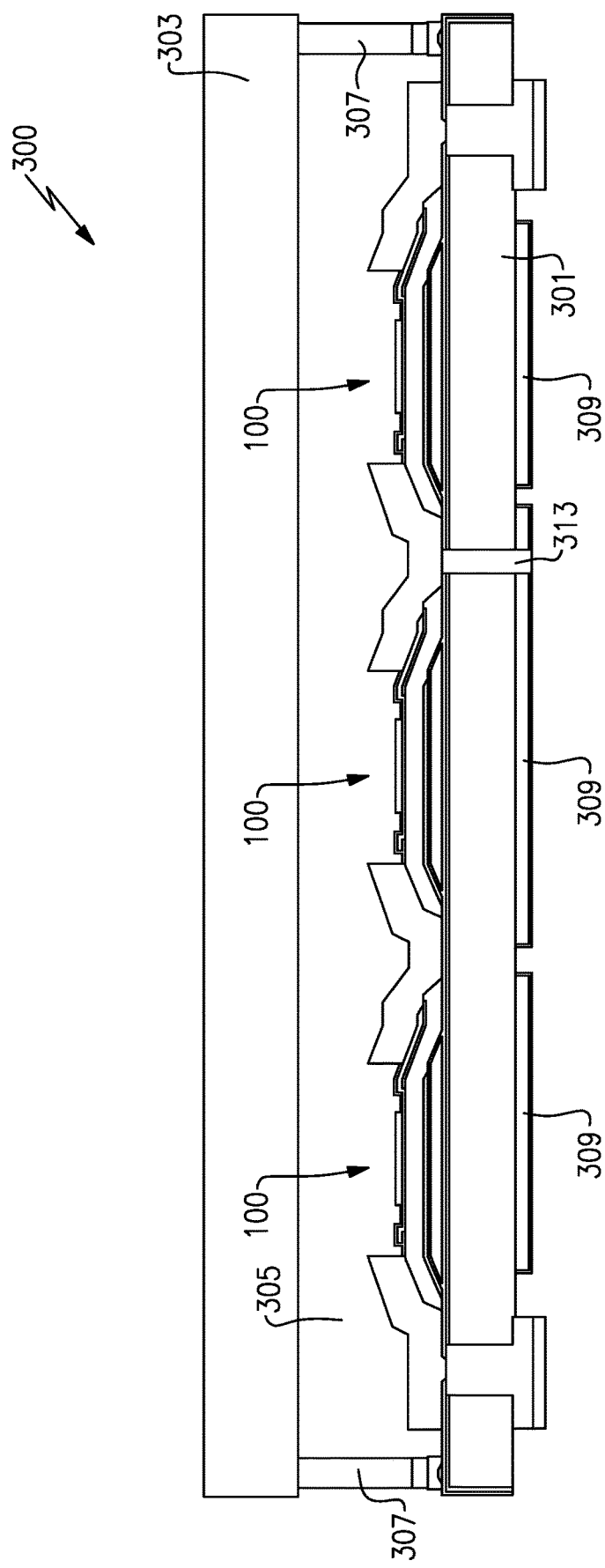
FIG. 9 is a cross-sectional diagram of a seventh RFFE module according to aspects disclosed herein.

The RFFE module of FIG. 9 also supports an antenna 309. In this case, the antenna 309 is supported by the first substrate 301. The antenna 309 is supported by an outer surface of the first substrate 301. The outer surface of the first substrate 301 is the surface facing away from the second substrate 303. That is, the outer surface is the surface of the first substrate 301 that is not within the cavity or enclosure 305 and does not have the FBARs 100 disposed upon it. To connect the FBARs 100 to the antenna 309, a connection 313 passes through the first substrate 301.

In the RFFE module of FIG. 9, the first substrate 301 is formed from a high permittivity material, on to which the antenna 309 is mounted directly. As noted above, this enables the size of the antenna to be reduced to enable it to be combined with the FBAR devices into a single physical module.

An eighth RFFE module according to the disclosure will now be discussed with respect to FIG. 10. The RFFE module 300 of FIG. 10 comprises a number of FBARs 100, of which three are shown. These are disposed on a surface of the first substrate 301. A second substrate 303 is provided as a cap over the FBARs 100. The volume between the first substrate 301 and the second substrate 303 is enclosed by pillars 307 around the periphery of the region occupied by the FBARs 100 to form a cavity or enclosure 305. A hermetic seal is formed between the pillars 307 and the first substrate 301 and the second substrate 303.

Figure 10:
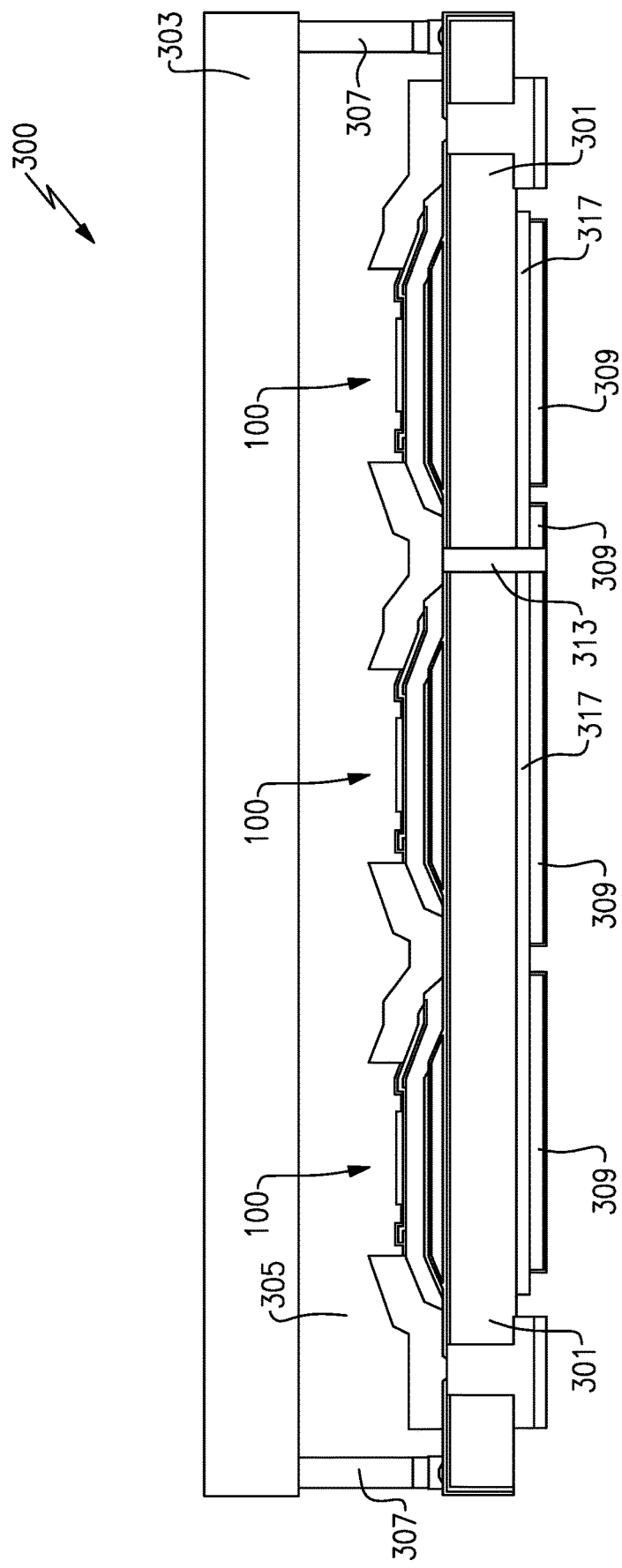
FIG. 10 is a cross-sectional diagram of an eight RFFE module according to aspects disclosed herein.

The RFFE module of FIG. 10 also supports an antenna 309. In this case, the antenna 309 is supported by the first substrate 301. The antenna 309 is supported by an outer surface of the first substrate 301. The outer surface of the first substrate 301 is the surface facing away from the second substrate 303. That is, the outer surface is the surface of the first substrate 301 that is not within the cavity or enclosure 305 and does not have the FBARs 100 disposed upon it. To connect the FBARs 100 to the antenna 309, a connection 313 passes through the first substrate 301.

In the RFFE module of FIG. 10, the first substrate 301 is formed from a high resistivity material, for example, a silicon or gallium arsenide (GaAs) wafer. The RFFE module 300 of FIG. 10 therefore comprises a layer of a high permittivity material 317 disposed on the outer surface of the first substrate 301 such that the antenna 309 is mounted on this layer of high permittivity material 317 rather than onto the high resistivity material of the second substrate directly. The use of a layer of high permittivity material 317 for mounting the antenna enables the size of the antenna to be reduced to enable it to be combined with the FBAR devices into a single physical module, in the same manner as when the second substrate is made entirely from a high permittivity material 317.

As noted above, an advantage associated with using a second substrate formed from a high resistivity material, and in particular the same material as the first substrate, is that they will have the same thermal expansion coefficient. This means that the stresses associated with the different thermal expansion coefficients are minimized compared to the case of the entire second substrate being manufactured from high permittivity material. Additionally, the use of a high permittivity layer 317 is easily applicable to current processes and chips which utilize cap wafers, i.e., second substrates, made from high resistivity silicon.

The RFFE modules of FIGS. 3-10 have all been illustrated as comprising a number of the FBARs illustrated in FIG. 1. However, variations on the FBARs that can be used in RFFE modules as disclosed herein are possible. One possible variation, compatible with any of the RFFE modules described herein according to the disclosure, will be described with respect to FIGS. 11-13.

Figure 11:
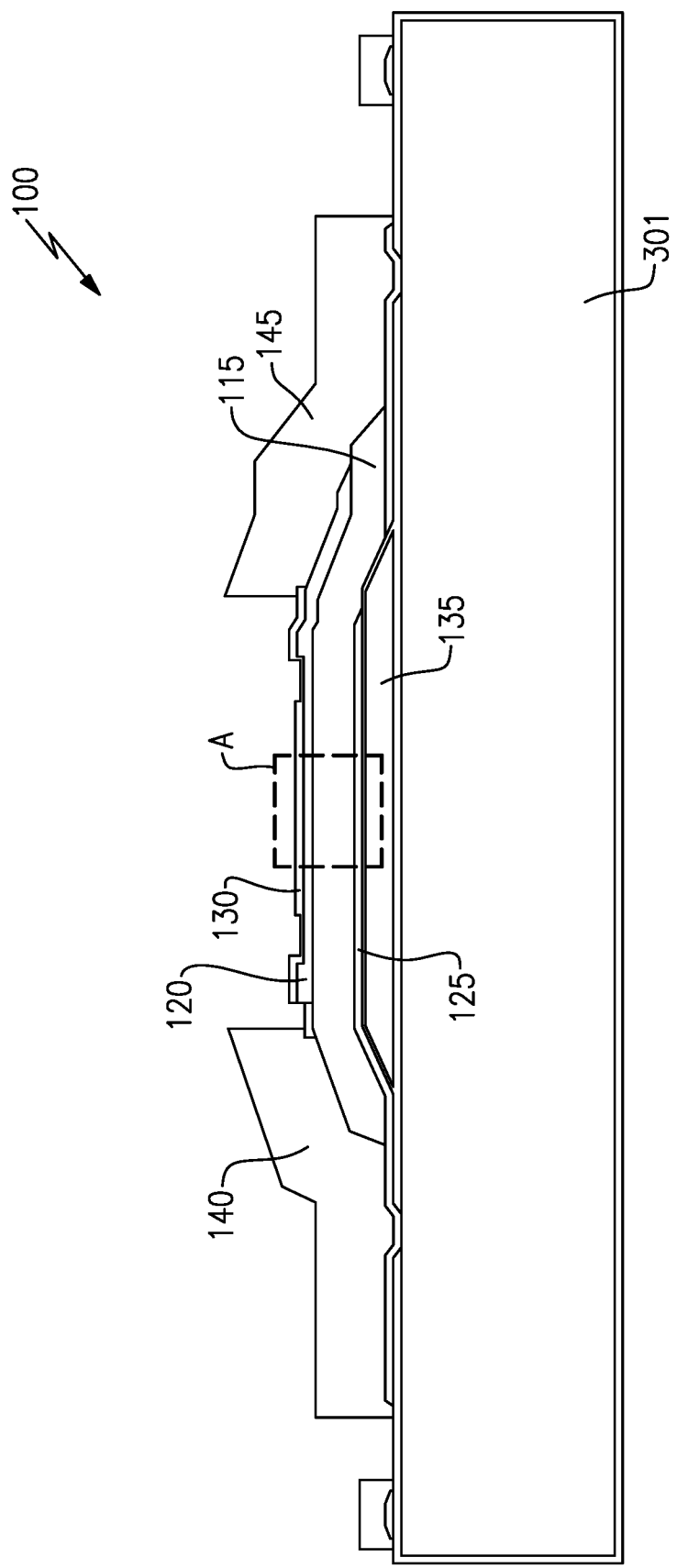
FIG. 11 is a cross-sectional diagram of an FBAR device.

Turning to FIG. 11, this figure illustrates a FBAR 100. The FBAR 100 is generally the same as that discussed in relation to FIG. 1, and is mounted on a substrate 301, such as a silicon wafer, and comprises a top electrode 120 and a bottom electrode 125 disposed either side of piezoelectric layer 115. The FBAR further comprises a cavity 135, and has a layer of dielectric material 130 disposed over the top electrode 120. The difference of the FBAR 100 of FIG. 11 compared to that of FIG. 1 will be discussed in relation to FIGS. 12A, 12B, 13A, and 13B.

Figure 12B:
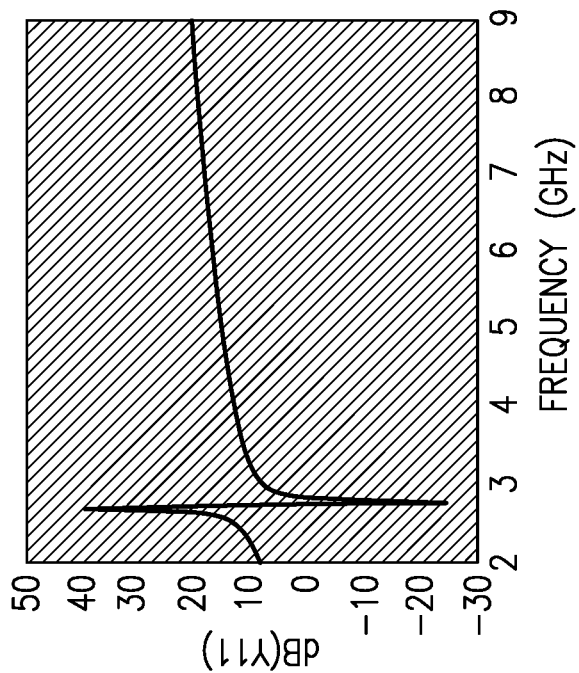
FIG. 12B illustrates the frequency response of the first mode of operation of an FBAR device.
Figure 12A:
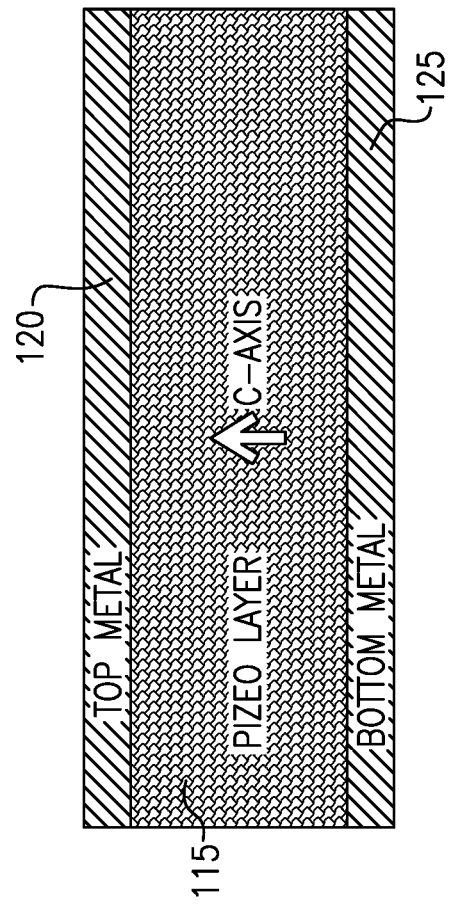
FIG. 12A illustrates a first mode of operation of an FBAR device.

FIG. 12A illustrates the region of box A in FIG. 11 in a conventional FBAR of FIG. 1. It comprises a single piezoelectric layer 115, bounded by a top electrode 120 and a bottom electrode 125. FIG. 12B illustrates the frequency response of such a device. The y-axis of FIG. 12B presents the admittance of the 1-port resonator, while the x-axis represents frequency. As can be seen, the resonant frequency lies between 2 GHz and 3 GHz (for the selected thickness of the piezoelectric layer 115). Such a mode of operation is known as a thickness extension (TE) mode.

Figure 13A:
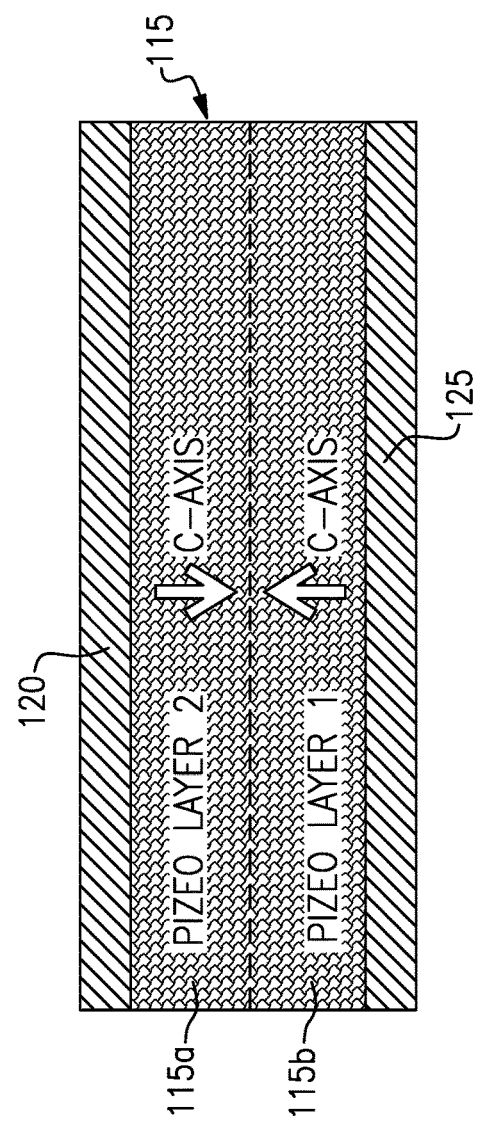
FIG. 13A illustrates a second mode of operation of an FBAR device.
Figure 13B:
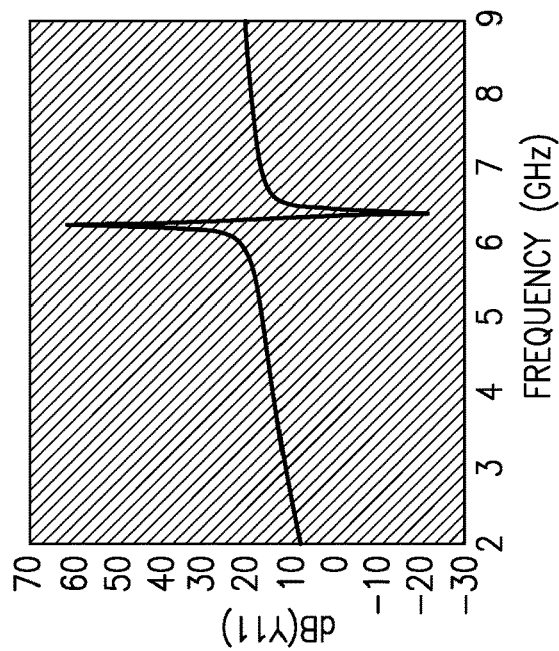
FIG. 13B illustrates the frequency response of the second mode of operation of an FBAR device.

FIG. 13A, on the other hand, illustrates a variation whereby the piezoelectric layer 115 is divided into two sub-layers 115a, 115b. The layers are distinguished by having different polarizations, as illustrated in the example of FIG. 13A wherein the piezoelectric layers are AlN layers having different orientations of the C-axis, the glide plane in the c-direction to the normal of the crystal structure, in each sub-layer 115a, 115b. Looking at the graph of FIG. 13B, the effect of dividing the piezoelectric layer 115 into two sub-layers 115a, 115b is apparent. The resonant frequency, for the same total thickness of the piezoelectric layer 115, is greatly increased, now lying between 6 GHz and 7 GHz. Such a mode of operation is known as an overtone mode. In this manner, by utilizing the overtone mode by having two (or more) layers of piezoelectric material with different polarizations, a FBAR device can be provided to operate in a range of desired frequencies.

While in the above description, the RFFE modules of this disclosure, as illustrated in FIGS. 3-10, have included FBAR devices, it will be appreciated that other types of acoustic devices or resonators may be used in combination with, or instead of, the FBAR devices. For example, Lamb wave resonators may be used in combination with, or instead of, the FBAR devices. Generally, Lamb wave resonators may operate at a higher frequency than FBAR devices (at least, when operating in their TE mode). Lamb wave resonators, therefore, may be preferred for high frequency applications, such as 5G FR2. An exemplary Lamb wave resonator that could be used in embodiments disclosed herein is described with respect to FIG. 14.

Figure 14:
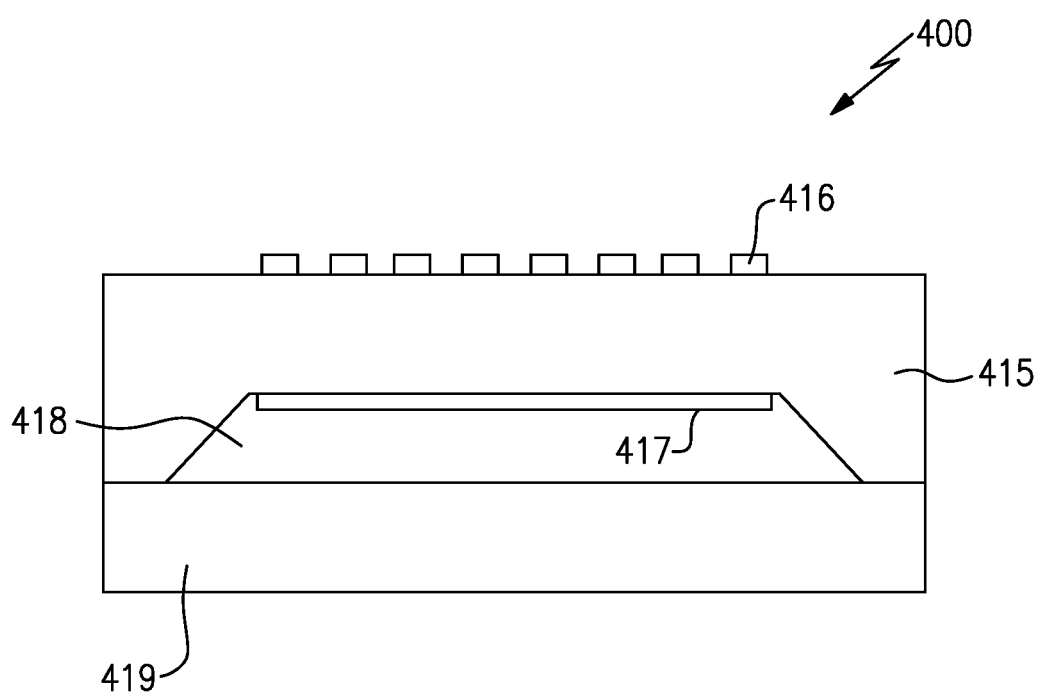
FIG. 14 is a cross-sectional diagram of a Lamb wave resonator.

FIG. 14 illustrates Lamb wave resonator 400. The Lamb wave resonator 400 includes features of a surface acoustic wave (SAW) resonator and a film bulk acoustic resonator (FBAR). As illustrated, the Lamb wave resonator 400 includes a piezoelectric layer 415, an interdigital transducer electrode (IDT) 416 on the piezoelectric layer 415, and a lower electrode 417 disposed on a lower surface of the piezoelectric layer 415 (i.e., a surface opposite the surface the IDT is disposed upon). The piezoelectric layer 415 can be a thin film. The piezoelectric layer 415 can be an aluminum nitride layer. In other instances, the piezoelectric layer 415 can be any suitable piezoelectric layer. The resonant frequency of the Lamb wave resonator can be based on the geometry of the IDT 416. The electrode 417 can be grounded in certain instances. In some other instances, the electrode 417 can be floating. An air cavity 418 is disposed between the electrode 417 and a semiconductor substrate 419. Any suitable cavity can be implemented in place of the air cavity 418, for example, a vacuum cavity or a cavity filled with a different gas.

Figure 15A:
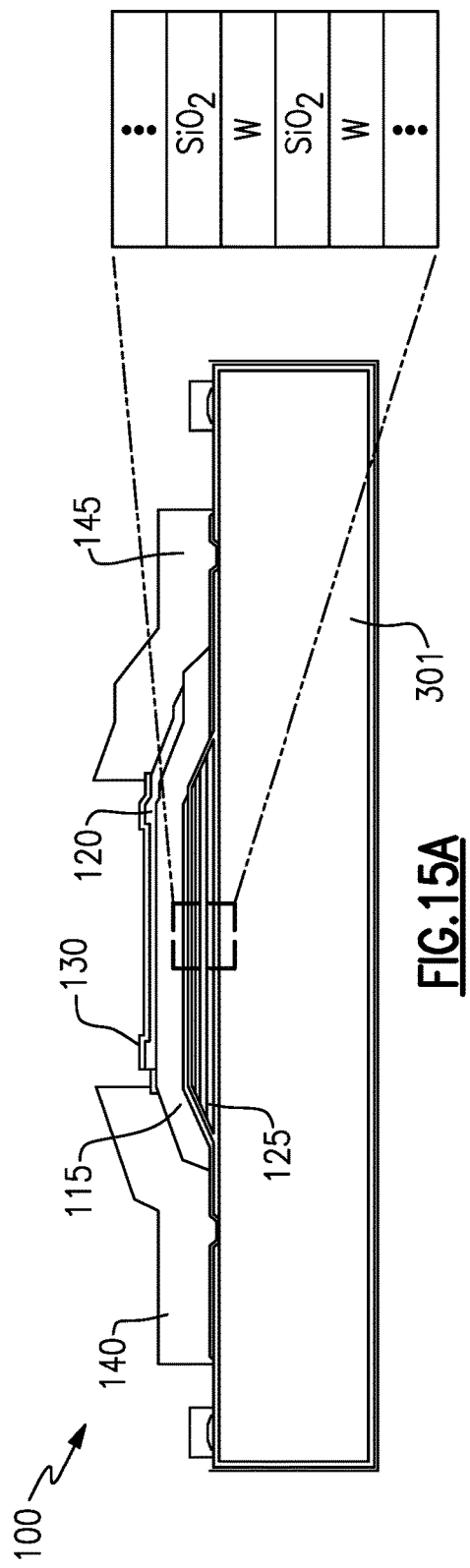
FIG. 15A is a cross-sectional diagram of an FBAR device comprising Bragg reflectors.
Figure 15B:
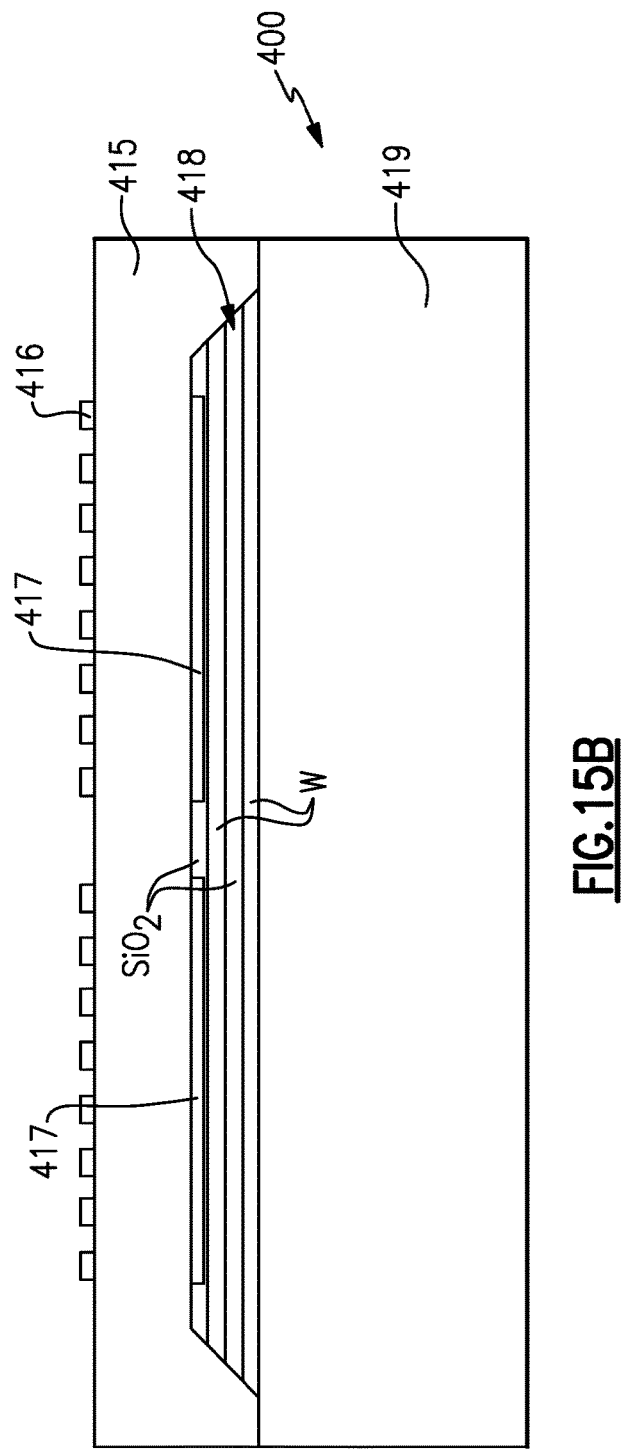
FIG. 15b is a cross-sectional diagram of a Lamb wave resonator comprising Bragg reflectors.

Furthermore, while the FBAR devices (e.g., FIG. 1) and Lamb wave resonators (e.g., FIG. 14) described herein have been taught as comprising an air cavity, the cavities may in fact not be air cavities but may comprise another material or materials. FIGS. 15A and 15b illustrate devices having cavities with alternating layers of silicon dioxide ($SiO_2$) and tungsten (W). The alternating $SiO_2$ and W layers are known as Bragg reflectors, and function as an acoustic mirror. It will be appreciated that other types of Bragg reflectors can be implemented, as can other suitable acoustic mirrors in place of the Bragg reflectors. FIG. 15A illustrates a FBAR device 100 comprising Bragg reflectors, while FIG. 15b illustrates a Lamb wave resonator 400 comprising Bragg reflectors.

The piezoelectric layers of the acoustic devices described herein may have been described with respect to a specific example, though it will be appreciated that other compositions of piezoelectric layer may be used. The selected piezoelectric material will be based upon, amongst other considerations, the desired frequency range of operation of the acoustic device. A non-exhaustive list of possible piezoelectric materials includes aluminum nitride (AlN), lithium niobate ($LiNbO_3$), lithium tantalate ($LiTaO_3$), lead titanate ($PbTiO_3$), and zirconium titanate ($ZrTiO_3$). High permittivity materials, suitable for forming the first and/or second substrates or applicable as a layer over a high resistivity substrate, as the case may be, can include lead zirconate (or zirconium) titanate ($Pb[Zr_xTi_{1-x}]O_3$, PZT), barium strontium titanate ($Ba_xSr_{1-x}TiO_3$, BST) materials, strontium oxide (SrO), tantalum pentoxide ($Ta_2O_5$), lithium niobate ($LiNbO_3$), $BaO$—$TiO_2$ system ($BaTiO_3$) and $(ZrSn)TiO_4$ system ($Zr_{0.8}Sn_{0.2}TiO_4$). Other suitable materials may also be used. High permittivity, as used herein, can mean materials having a high relative permittivity compared to the permittivity of free space, $\varepsilon_0$, such as over 20 times greater, over 30 times greater, or over 40 times greater. High resistivity materials, suitable for forming the first and/or second substrates in certain embodiments can include silicon (Si) and gallium arsenide (GaAs). High resistivity, as used herein, can mean materials having a resistivity of greater than or equal to 200 Ωm, or greater than or equal to 2,000 Ωm.

The RFFE modules described herein may be manufactured in a variety of ways, using conventional techniques. The second substrate, also known as a cap wafer, may be bonded to the first substrate (or device wafer) using a plurality of techniques, including polymer bonding, transient liquid phase (TLP) bonding, or room temperature bonding. Certain bonding techniques, such as polymer bonding and room temperature bonding may cope better with a difference in thermal expansion coefficients between the first substrate and the second substrate. The RFFE modules described herein may also be formed using wafer-level packaging (WLP) techniques.

The antenna may be added to the first or second substrate before or after the second substrate is bonded to the first substrate. This will partly depend upon the position of the antenna. If the antenna is positioned on an internal surface of the second substrate (e.g., FIGS. 3, 5, 6 and 8) then it should be formed prior to the bonding of the second substrate to the first substrate. In other embodiments, when the antenna is formed on the outer surface of the first substrate or the second substrate (e.g., FIGS. 4, 5, and 7-10) the antenna may be formed after the bonding of the second substrate to the first substrate. The same applies to the creation of the layer of high permittivity material upon the first or second substrate, when the first or second substrate is made from a high resistivity material.

Figure 16:
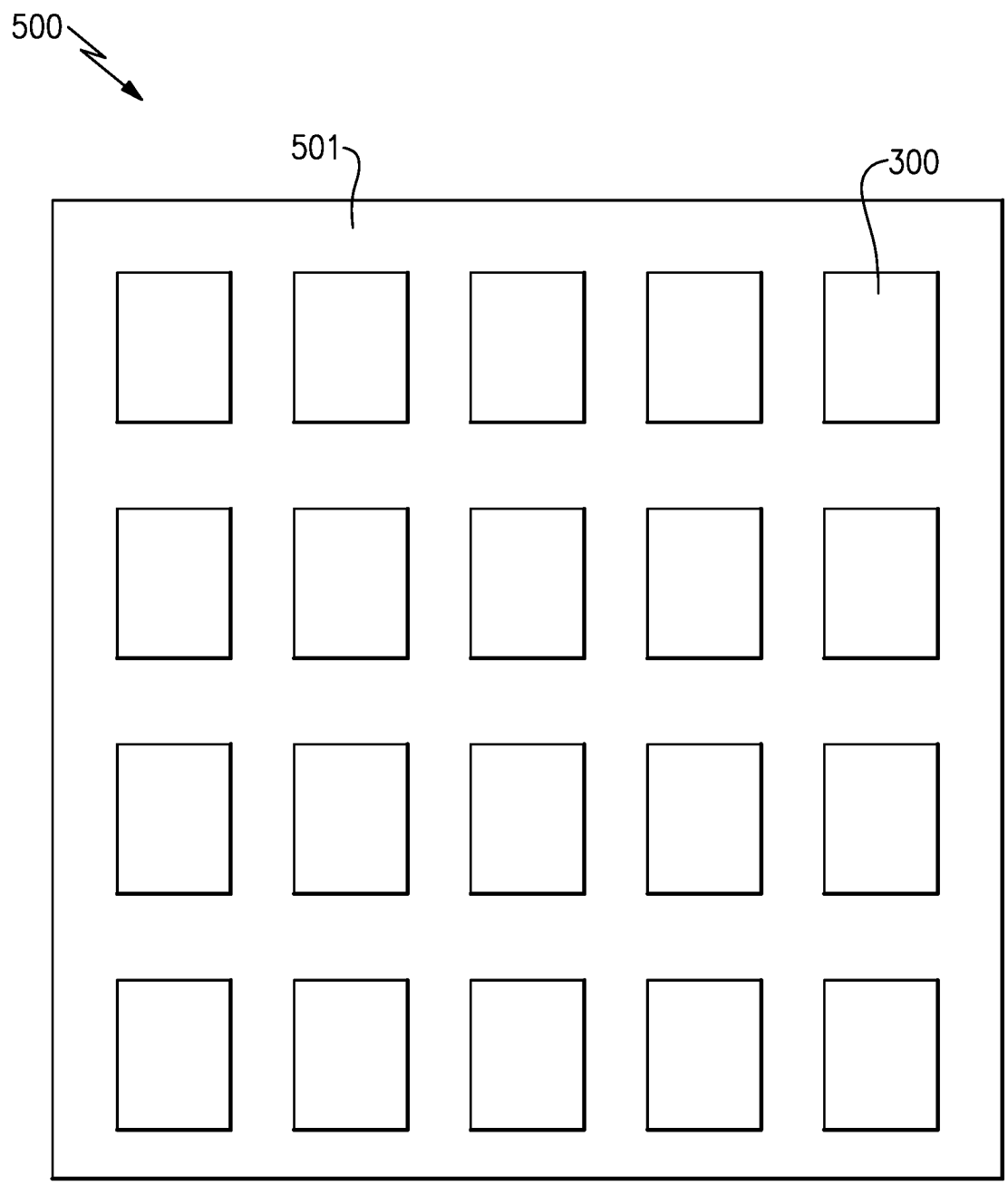
FIG. 16 illustrates an array of RFFE modules according to aspects disclosed herein.

The present disclosure also provides for a beamforming antenna module, as illustrated in FIG. 16. The beamforming antenna module 500 comprises a plurality of RFFE modules 300 arranged in an array. The RFFE modules 300 may be any of the RFFE modules described herein. The RFFE modules 300 are mounted on a substrate 501.

Arranging the RFFE modules in this manner enables the directional receiving of signals, as well as to provide directionality to a transmitted signal, depending upon whether the beamforming antenna module is part of the receive chain, the transmit chain, or both. The use of the RFFE modules described herein in a beamforming antenna module enables the signal from each antenna in the beamforming antenna module to easily be individually filtered prior to processing the combined signal from each antenna, increasing the quality and strength of the output signal.

The number of RFFE modules within the beamforming antenna module may vary, and will be determined based upon the desired application. The beamforming antenna module may comprise 4, 6, 20 or another number of RFFE modules. Furthermore, the sizes and the patterns of the antenna of each constituent RFFE module comprising the beamforming antenna module will also be determined by the desired application and required functionality. It should be noted that the RFFE modules in a beamforming antenna module need not necessarily have the same size and/or pattern of antenna.

Figure 17:
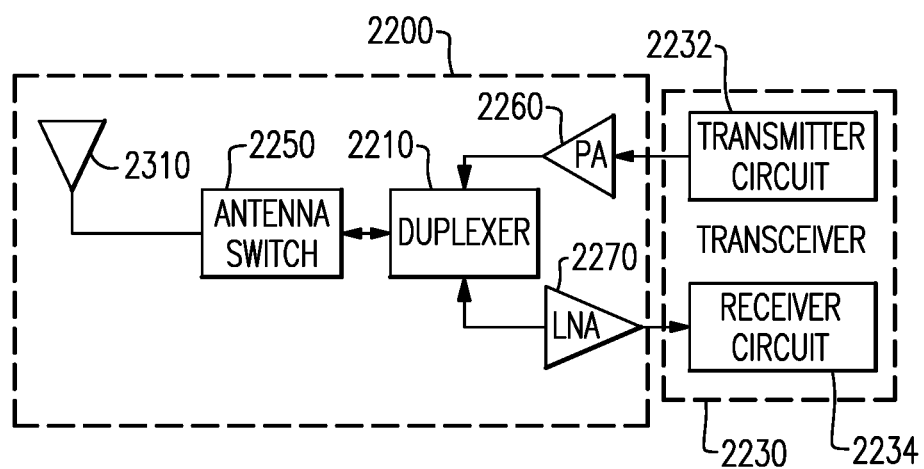
FIG. 17 is a schematic of a RFFE module incorporating aspects disclosed herein.

A schematic of an exemplary RFFE module in accordance with the present disclosure is shown in FIG. 17. This figure illustrates a front end module 2200, including an antenna 2310, connected to a transceiver 2230. The front end module 2200 includes a duplexer 2210 in communication with an antenna switch 2250, which itself is in communication with the antenna 2310.

As illustrated, the transceiver 2230 comprises a transmitter circuit 2232. Signals generated for transmission by the transmitter circuit 2232 are received by a power amplifier (PA) module 2260 within the front end module 220 which amplifies the generated signals from the transceiver 2230. The PA module 2260 can include one or more PAs. The PA module 2260 can be used to amplify a wide variety of RF or other frequency-band transmission signals. For example, the PA module 2260 can receive an enable signal that can be used to pulse the output of the PA to aid in transmitting a wireless local area network (WLAN) signal or any other suitable pulsed signal. The PA module 2260 can be configured to amplify any of a variety of types of signal, including, for example, a Global System for Mobile (GSM) signal, a code division multiple access (CDMA) signal, a W-CDMA signal, a Long Term Evolution (LTE) signal, or an EDGE signal. In certain embodiments, the PA module 2260 and associated components including switches and the like can be fabricated on gallium arsenide (GaAs) substrates using, for example, high electron mobility transistors (pHEMT) or insulated-gate bipolar transistors (BiFET), or on a silicon substrate using complementary metal-oxide semiconductor (CMOS) field effect transistors (FETs).

Still referring to FIG. 17, the front end module 2200 may further include a low noise amplifier (LNA) module 2270, which amplifies received signals from the antenna 2310 and provides the amplified signals to the receiver circuit 2234 of the transceiver 2230.

Figure 18:
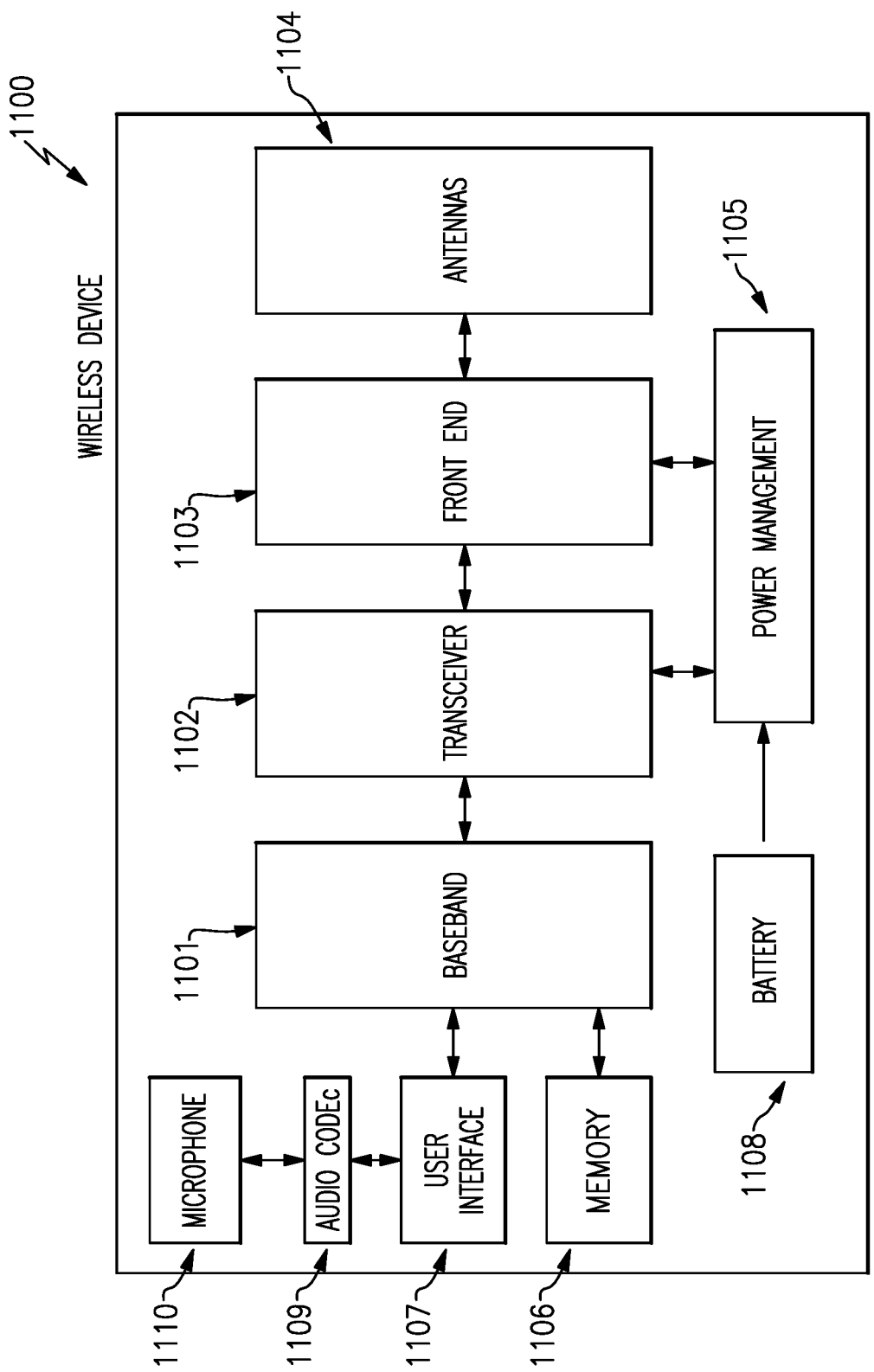
FIG. 18 is a schematic of a wireless device incorporating aspects disclosed herein.

FIG. 18 is a schematic diagram of a wireless device 1100 that can incorporate aspects disclosed herein. The wireless device 1100 can be, for example, but not limited to, a portable telecommunication device such as, a mobile cellular-type telephone. The wireless device 1100 can include a microphone arrangement 1110, and may include one or more of a baseband system 1101, a transceiver 1102, a front end system 1103, one or more antennas 1104, a power management system 1105, a memory 1106, a user interface 1107, a battery 1108, and audio codec 1109. The microphone arrangement may supply signals to the audio codec 109 which may encode analog audio as digital signals or decode digital signals to analog. The audio codec 1109 may transmit the signals to a user interface 1107. The user interface 1107 transmits signals to the baseband system 1101. The transceiver 1102 generates RF signals for transmission and processes incoming RF signals received from the antennas. The front end system 1103 aids in conditioning signals transmitted to and/or received from the antennas 1104. The antennas 1104 can include antennas used for a wide variety of types of communications. For example, the antennas 1104 can include antennas 1104 for transmitting and/or receiving signals associated with a wide variety of frequencies and communications standards. The baseband system 1101 is coupled to the user interface to facilitate processing of various user input and output, such as voice and data. The baseband system 1101 provides the transceiver 1102 with digital representations of transmit signals, which the transceiver 1102 processes to generate RF signals for transmission. The baseband system 1101 also processes digital representations of received signals provided by the transceiver 1102.

As shown in FIG. 18, the baseband system 1101 is coupled to the memory 1106 to facilitate operation of the wireless device 1100. The memory 1106 can be used for a wide variety of purposes, such as storing data and/or instructions to facilitate the operation of the wireless device 1100 and/or to provide storage of user information. The power management system 1105 provides a number of power management functions of the wireless device 1100. The power management system 1105 receives a battery voltage from the battery 1108. The battery 1108 can be any suitable battery for use in the wireless device, including, for example, a lithium-ion battery.

The RFFE modules described herein may be incorporated into the wireless device 1100 of FIG. 18, in particular providing the front end system 1103 and the antennas 1104. In some cases, the wireless device may include an array of RFFE modules to provide a beamforming antenna, as discussed in relation to FIG. 16.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A radio-frequency front end module comprising:
   a first substrate;
   a second substrate arranged opposing the first substrate, the second substrate comprising a high resistivity material and a layer of a high permittivity material disposed upon an external surface of the high resistivity material, the external surface of the high resistivity material of the second substrate being on a side of the second substrate facing away from the first substrate;
   one or more resonators disposed on a first surface of the first substrate and within a cavity defined between the first substrate and the second substrate, the first surface of the first substrate facing the second substrate; and
   one or more antennas disposed on the layer of high permittivity material of the second substrate.

2. The radio-frequency front end module of claim 1 further comprising one or more additional antennas electrically connected to the one or more antennas and disposed on a layer of the high permittivity material that is disposed on an internal surface of the high resistivity material of the second substrate, the internal surface of the high resistivity material of the second substrate being on an opposite side of the second substrate from the external surface of the high resistivity material of the second substrate.

3. The radio-frequency front end module of claim 1 wherein the first substrate lies within a first plane and the second substrate lies within a second plane, the second plane being parallel to the first plane.

4. The radio-frequency front end module of claim 1 wherein the first substrate and the second substrate are hermetically sealed to form the cavity between the first substrate and the second substrate.

5. The radio-frequency front end module of claim 1 wherein the one or more resonators are electrically connected to the one or more antennas.

6. The radio-frequency front end module of claim 1 wherein the one or more resonators include one or more or bulk acoustic wave resonators and/or Lamb wave resonators.

7. The radio-frequency front end module of claim 1 wherein the one or more antennas are patch antennas.

8. The radio-frequency front end module of claim 1 wherein either or both of the first substrate or the high resistivity material of the second substrate comprises silicon.

9. The radio-frequency front end module of claim 1 wherein all of the one or more antennas are disposed on the layer of the high permittivity material that is disposed on the high resistivity material of the second substrate.

10. The radio-frequency front end module of claim 1 further comprising a layer of the high permittivity material disposed on an external surface of the first substrate, the external surface of the high resistivity material of the first substrate being on a side of the first substrate facing away from the second substrate, and one or more additional antennas disposed on the layer of the high permittivity material that is disposed on the external surface of the first substrate.

11. The radio-frequency front end module of claim 1 wherein the high permittivity material comprises lithium niobate.

12. The radio-frequency front end module of claim 1 wherein the high resistivity material comprises one of Si or GaAs.

13. The radio-frequency front end module of claim 1 wherein the layer of high permittivity material has a thickness substantially less than a thickness of the second substrate.

14. The radio-frequency front end module of claim 1 wherein the first substrate comprises the high resistivity material and a layer of the high permittivity material disposed on the high resistivity material.

15. The radio-frequency front end module of claim 14 further comprising one or more additional antennas disposed on the layer of high permittivity material of the first substrate.

16. The radio-frequency front end module of claim 14 wherein the layer of high permittivity material has a thickness substantially less than a thickness of the first substrate.

17. A wireless mobile device comprising a radio-frequency front end module, the radio-frequency front end module having a first substrate, a second substrate arranged opposing the first substrate, the second substrate comprising a high resistivity material and a layer of a high permittivity material disposed upon an external surface of the high resistivity material, the external surface of the high resistivity material of the second substrate being on a side of the second substrate facing away from the first substrate, one or more resonators disposed on a surface of the first substrate and within a cavity defined between the first substrate and the second substrate, the surface of the first substrate facing the second substrate, and one or more antennas disposed on the layer of high permittivity material of the second substrate.

18. A beamforming antenna module comprising an array of radio-frequency front end modules, each radio-frequency front end module having a first substrate, a second substrate arranged opposing the first substrate, the second substrate comprising a high resistivity material and a layer of a high permittivity material disposed upon an external surface of the high resistivity material, the external surface of the high resistivity material of the second substrate being on a side of the second substrate facing away from the first substrate, one or more resonators disposed on a surface of the first substrate and within a cavity defined between the first substrate and the second substrate, the surface of the first substrate facing the second substrate, and one or more antennas disposed on the layer of high permittivity material of the second substrate.

* * * * *